April 24, 1956   J. L. GYLLENBERG   2,742,988
OVERLOAD RELEASE CLUTCH
Filed Nov. 7, 1952   2 Sheets-Sheet 2
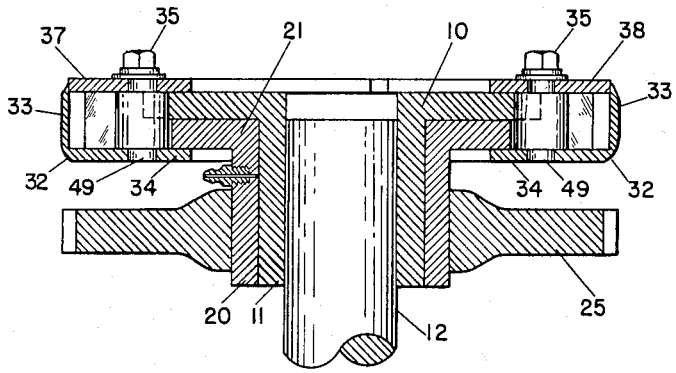
Fig. 4
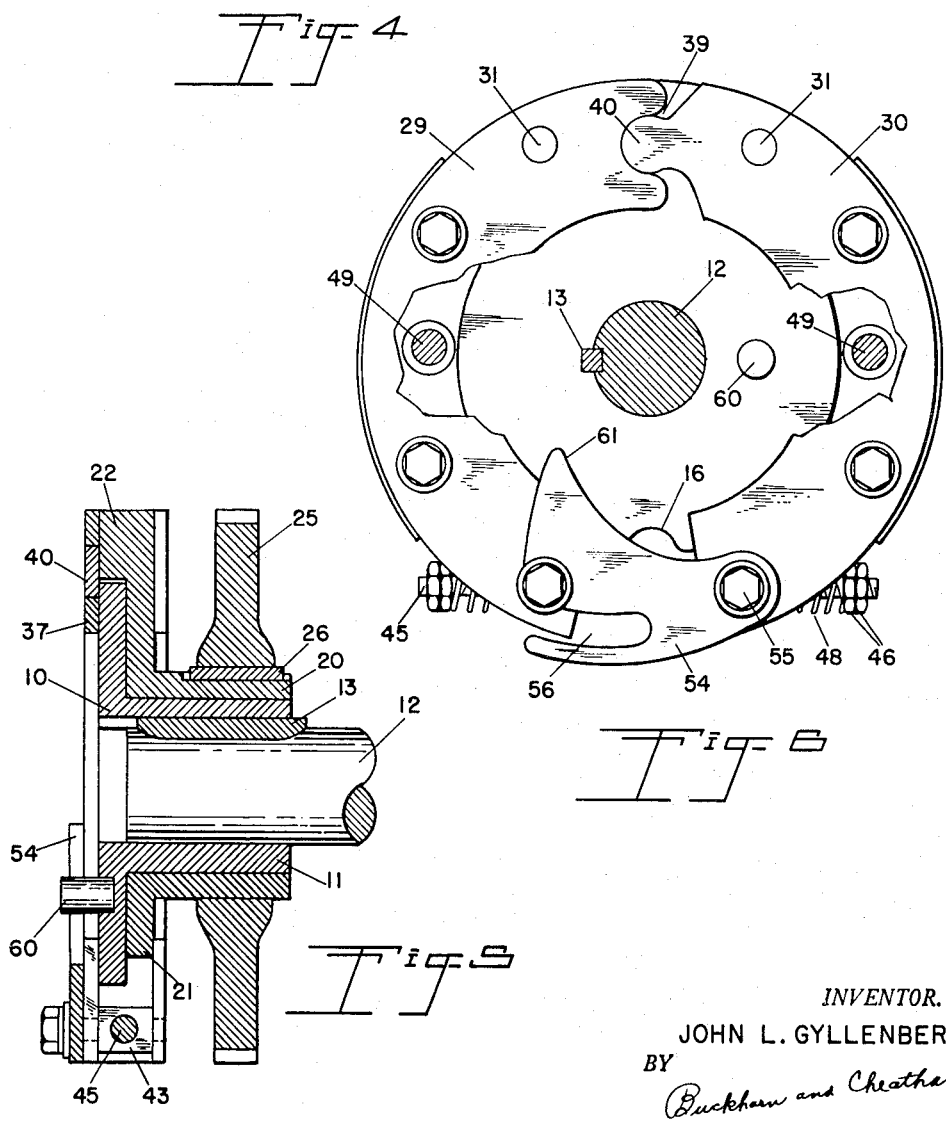
Fig. 6
Fig. 5
INVENTOR.
JOHN L. GYLLENBERG
BY
Buckhorn and Cheatham
ATTORNEYS United States Patent Office 2,742,988
Patented Apr. 24, 1956

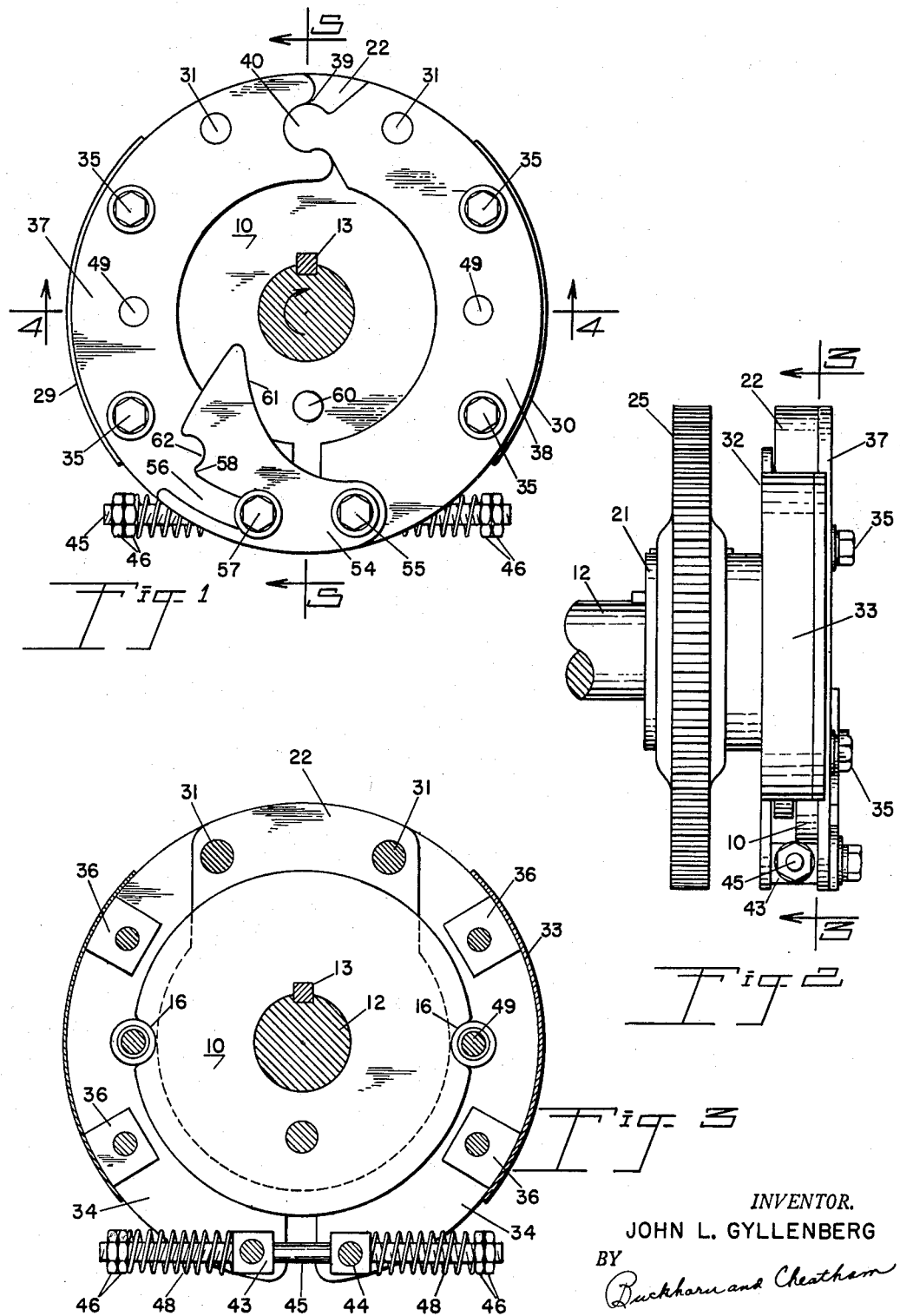

2,742,988

OVERLOAD RELEASE CLUTCH

John Lee Gyllenberg, Baker, Oreg., assignor to Anthony Brandenthaler, Baker, Oreg.

Application November 7, 1952, Serial No. 319,383

10 Claims. (Cl. 192—56)

The present invention relates to a clutch mechanism and more particularly to an automatic overload release clutch.

While automatic overload releasing clutches have been provided heretofore comprising driving and driven members with a releasable pawl for effecting driving connection therebetween, they usually have the disadvantage that following disruption of the driving connection, the pawl continues to ride upon the cooperating element with resultant chatter and wear of the connection elements. The pull out torque is thus varied, requiring frequent readjustment while the useful life of the device is shortened.

It is a general object of the present invention to provide a clutch of the class described in which the driving connection elements are shifted to a nonwearing position immediately upon disruption of the driving connection.

It is a further object of the present invention to provide an overload release clutch including new and improved means for disrupting the driving connection between the driving and driven members upon occurrence of an overload condition, but which means may be easily actuated to remake the connection.

Still another object of the invention is to provide a new and improved latching arrangement for a clutch of the class described whereby wear of the driving elements is minimized.

A further object is to provide a clutch capable of transmitting high torque with relatively low stress on the parts thereof.

A still further object is to provide a clutch which may be easily adjusted to disengage at various overload torques.

Other objects and advantages of the present invention will become more apparent hereinafter.

In accordance with the illustrated embodiment, the clutch of the present invention includes a driving member adapted to be mounted upon a drive shaft, the driving member including a portion having a notched periphery. Rotatably mounted on the driving member is a driven member on which is pivotally mounted a pair of complementary, semicircular lever units which extend about the periphery of the notched driving member portion. Each of the lever units supports a roller which is adapted to engage in the notches of the driving member to effect a driving connection between the driving member and the driven member, resilient means being provided to urge the free ends of the lever units together to retain the rollers within the notches. A catch means adapted to move the lever units to an inoperative position and to latch the units therein is arranged between the free ends of the lever units, means being provided on the driving member to effect operation of the catch means when slippage occurs between the members. For a more detailed description of the present invention, reference is made to the following specification taken in connection with the accompanying drawings wherein:

Fig. 1 is a front elevation of the clutch of the invention showing it in operative position;

Fig. 2 is a side elevation of the clutch as viewed from the left of Fig. 1;

Fig. 3 is a sectional view of the clutch taken along the line 3—3 of Fig. 2;

Fig. 4 is a cross-sectional view along the lines 4—4 of Fig. 1;

Fig. 5 is a cross-sectional view along the lines 5—5 of Fig. 1; and

Fig. 6 is a further front elevation showing the clutch in its inoperative position, with portions of the clutch broken away to more clearly illustrate the structure thereof.

Referring now to the drawings, the clutch includes a circular driving member 10 having a hub 11 (Fig. 5) adapted to be suitably secured on a drive shaft 12 such as by a key 13. The periphery of the driving member 10 is provided with a pair of oppositely disposed, semicircular notches or recesses 16, as most clearly shown in Fig. 6. A driven member is rotatably mounted on the hub 11 consisting of a hub 20 and a flange portion 21 extending adjacent the driving member 10, a part of the driven member flange portion 21 extending outwardly of the periphery of the driving member to form a lever mounting portion 22, as will be more fully described hereinafter. The hub portion 20 of the driven member is adapted to be secured, as by key 26, to any suitable power take-off means such as the gear or chain sprocket 25.

The driving connection between the driving member 10 and driven member is effected through one or more pawls such as a pair of complementary, semicircular lever units 29 and 30, adjacent ends of which are pivotally secured to the lever mounting portion 22 by means of pins 31. The lever units 29 and 30 are substantially the same in construction, and each includes a casting 32, which is L-shaped in cross section as seen in Fig. 4, having an arcuately shaped web portion 33 and a flange 34 extending radially inwardly adjacent the rearmost surface, as shown in the drawings, of the driven member flange portion 21. Secured to the casting 32 of the lever unit 29 as by studs 35 cooperatively threaded in the spacer blocks 36 also forming a part of the casting 32, is a front flange 37 extending radially inwardly adjacent the front surface of the driving member. Similarly secured to the casting of the lever unit 30 is a front flange 38. The adjacent pivoted ends of the flanges 37 and 38 are provided with cooperative camming surfaces to equalize the pivotal movement of the lever units, the purpose of which will become apparent hereinafter. As shown, the end of flange 37 is formed with an arcuate socket 39 in which is received cooperatively the tongue 40 formed in the end of the flange 38. The pins 31 extend through cooperative openings in the lever mounting portion 22, the opposite ends of the pins being of reduced diameter and cooperatively received in openings provided therefor in the lever flange portions 34, 37 and 38.

Resilient means are operatively connected between the lever units 29, 30 for urging the free ends thereof together. Referring now more particularly to Figs. 3 and 5, blocks 43 and 44 are mounted between the lever unit flange portions at the free end of the lever units 29, 30, respectively, each of the blocks 43, 44 having an opening therethrough, which openings are axially aligned and through which is slidably received an elongated bolt 45. The opposite ends of the bolt 45 are threaded to receive a pair of lock nuts 46, compression springs 48 being provided between the blocks 43, 44 and the lock nuts 46, on the corresponding end of the bolt 45 to urge the free ends of the lever units 29, 30 together, the tension of the springs being adjustable by means of the nuts 46.

Mounted on each of the lever units between the flange portions thereof is a roller member 49 adapted to engage cooperatively in the recesses 16 when the lever units are in their inward, operative position, as may best be seen in Figs. 3 and 4. The roller members 49 and the recesses 16 act as cooperative drive means to urge the driven member to rotate in the same direction as the driving member, the bias of the springs 48 urging the roller members 49 into the recesses 16.

It will be apparent that the counter-rotational torque of the load upon the gear 25 will tend to retard the rotation of the driven member whereby the reaction between the engaging surfaces of the recesses 16 and the roller members 49 will tend to urge the roller members out of the recesses and force the lever units apart against the compressive bias of the springs 48, which action will occur when the overload torque is sufficient to overcome the bias of the springs 48. When the roller members 49 and the recesses 16 are disengaged, the driving member and the driven member will be free to rotate relative to one another with the roller members sliding upon the periphery of the driving member between the recesses. If the lever units 29, 30 were not positively restrained from inward movement, the roller members 49 would reengage with the notches every relative half revolution between the driving member and the driven member. This, of course, is not desirable since the reengagement of the roller members 49 and the recesses 16 would cause undue strain upon the parts of the clutch itself, the driving motor or the mechanism being driven through the clutch. Cooperative means are provided, therefore, for urging the free ends of the lever units 29 and 30 into spaced relation where the lever units are latched in an outward, inoperative position and the roller members 49 spaced from the periphery of the driving member upon the occurrence of an overload condition. Referring now more particularly to Figs. 1 and 6, a catch plate 54 overlapping the free ends of the lever units 29, 30 is pivotally mounted on the lever unit 30 by means of a stud 55 which is threaded into the block 44. The catch plate 54 is formed with an arcuate slot 56 slidably receiving the shank of a stud 57 threaded into the block 43 in the free end of the lever unit 29. When an overload is applied to the clutch and the free ends of the lever units 29, 30 separate, the catch plate 54 will move relative to the stud 57 received in the slot 56. The inner side of the slot 56 is of such length that the stud 57 will just clear the slot when the roller members 49 are sliding on the periphery of the driving member, an angularly disposed cam surface 58 being formed on the catch plate to engage the shank of the stud 57 when the catch plate is in this position. As the driving member rotates further relative to the lever units 29, 30 a pin 60 projecting from the face of the flange portion 15 of the driving member will engage the camming surface 61 formed on an inwardly extending portion of the catch plate, to force the catch plate 54 outwardly in respect to the clutch axis to further spread the lever units apart as the camming surface 58 slides on the shank of the stud 57. This further movement of the lever units 29, 30 will withdraw the roller members 49 from contact with the periphery of the driving member and preclude any possibility of the roller members engaging in the recesses 16. The cooperative action between the tongue 40 and the socket 39 causes both of the lever units to move outwardly by equal amounts and withdraw both of the roller members from contact with the driving member. A positive stop or latch is provided to hold the lever units apart, which latch comprises a notch 62 formed in the catch plate 54 in which the shank of the stud 57 is received when the catch plate is moved to its outermost position as a result of the engagement of the pin 60 with the camming surface 61, which position is shown in Fig. 6. To release the catch and effect reengagement of the clutch, the catch plate is simply struck upon its outer edge to cause it to move inwardly and free the stud 57 from engagement with the notch 62, the springs 48 biasing the lever units 29, 30 together and forcing the roller members 49 into engagement with the notches 16 when they are in alignment.

The clutch can be adapted for driving in the opposite direction by simply removing the studs 55 and 57 and reversing the relative position of the catch plate 54 between the lever units 29 and 30. As will be apparent, a rugged, compact clutch is provided in the present invention that may be easily integrated into existing installations since it may be mounted on standard drive shafts.

The terms "driving member" and "driven member" are used in the specification and claims only relatively for clarity of description, and it should be apparent that the clutch can be utilized to transmit power from the gear 25 or other suitable means to the shaft 12.

Having illustrated and described a preferred embodiment of the present invention, it should be apparent to those skilled in the art that the same permits of modification in arrangement and detail. I claim as my invention all such modifications as come within the true spirit and scope of the following claims.

I claim:

1. An overload release clutch comprising a circular driving member having a cylindrical hub adapted to be mounted on a drive shaft, a driven member rotatably mounted on said hub and having a lever mounting portion extending outwardly of the periphery of said driving member, a pair of complementary, semicircular lever units extending about the periphery of said driving member, said lever units being U-shaped in cross section and including flange portions extending radially inwardly on opposite sides of said mounting portion and said driving member, a pair of adjacent ends of said lever units being pivotally mounted on said extending portion, said driving member having spaced recesses formed in the periphery thereof, a pair of roller elements mounted one on each of said lever units between said flange portions and adapted to engage cooperatively in said recesses, and adjustable tension means operatively connecting the free ends of said lever units to urge said free ends together and to urge said roller elements into said recesses.

2. An overload release clutch comprising a driving member including a cylindrical hub and a circular flange portion at one end thereof, a driven member rotatably mounted on said hub and having a flange portion adjacent the flange of said driving member, a pair of complementary, semicircular levers, means pivotally mounting one pair of adjacent ends of said levers on one of said members, the other of said members having spaced recesses formed in the periphery thereof, a pair of roller members mounted one on each of said levers and adapted to engage cooperatively in said recesses, adjustable tension means operatively connecting the free ends of said levers to urge said free ends together and to urge said rollers into said recesses, catch means operatively arranged at the free ends of said levers for retaining said ends in spaced relation, and cooperative means on said catch means and on said other member for forcing said catch means into operative position upon relative rotational movement between said driving member and said driven member.

3. An overload release clutch comprising a driving member including a circular portion having a notched periphery, a coaxially mounted driven member, a pair of complementary, substantially semi-circular lever units pivotally mounted at one pair of adjacent ends on said driven member and extending about the periphery of said driving member portion, resilient means operatively connected between said lever units for urging the free ends thereof together, roller means mounted in each of said lever units adapted to engage cooperatively the notches in said driving member, catch means operatively arranged between the free ends of said lever units for holding said free ends in spaced relation with said roller means spaced from the periphery of said driving member, and cooperative means on said catch means and on said driving member for forcing said catch means into operative position upon the occurrence of an overload condition.

4. An overload release clutch comprising a rotatable, circular driving member, a rotatable driven member adjacent said driving member and coaxial therewith, a pair of complementary, semicircular lever units extending about the periphery of said driving member, a pair of adjacent ends of said lever units being pivotally mounted on said driven member, resilient means operatively connected between said lever units for urging the free ends thereof together, cooperative drive means on each of said lever units and on the periphery of said driving member adapted to engage cooperatively in a driving connection when said lever units are in an inward, operative position, catch means operatively arranged between the free ends of said lever units for forcing said free ends apart upon occurrence of an overload condition, and holding the said drive means of said lever units spaced from the periphery of said driving member, and cooperative interengaging tongue and socket means on said lever unit adjacent ends for effecting equal pivotal movement of said lever units.

5. An overload release clutch comprising a driving member, a driven member adjacent said driving member and coaxial therewith, a pair of complementary, semicircular lever units extending about the periphery of said driving member, a pair of adjacent ends of said lever units being pivotally mounted on said driven member, said lever units adapted to pivot inwardly into an operative position and outwardly into an inoperative position, cooperative drive means on each of said lever units and on the periphery of said driving member adapted to engage cooperatively in a driving connection when said lever units are in cooperative position, means operatively arranged between said lever units and said driving member to pivot said lever units outwardly into inoperative position upon occurrence of an overload condition, whereby to prevent reengagement of said drive means, and cooperative camming surface on said lever unit adjacent ends for effecting equal pivotal movement of said lever units.

6. In an overload releasing clutch including coaxial rotatable driving and driven members, a pawl pivotally mounted on one of said members, an element on the other of said members having a notch engageable by said pawl to effect a driving connection between said members, said driving connection being automatically disruptable upon occurrence of an overload, means on said element spaced angularly from said notch and cooperative means on said pawl adapted to engage with said pin following disruption of said driving connection for lifting said pawl to an inoperative position remote from said element during any relative angular relation of said driving and driven members, and latch means for retaining said pawl in said inoperative position.

7. In an overload releasing clutch including coaxial rotatable driving and driven members, pawl means pivotally mounted on one of said members, a disc on the other of said members having notches in the periphery thereof engageable by said pawl means to effect a driving connection between said members, said driving connection being automatically disruptable upon occurrence of an overload, a pawl lifting pin extending outwardly from one side of said disc and a pawl lifting cam on said pawl means adapted to engage with said pin following disruption of said driving connection and lift said pawl means to an inoperative position spaced from the periphery of said disc during any relative angular relation of said driving and driven members, and releasable latch means on said members for cooperatively engaging and latching said pawl means in said inoperative position.

8. In an overload releasing clutch including coaxial rotatable driving and driven members, a pawl pivotally mounted on one of said members, an element on the other of said members having a notch engageable by said pawl to effect a driving connection between said members, said driving connection being automatically disruptable upon occurrence of an overload, a pawl lifting pin on said other member and cam means on said pawl adapted to engage with said pin following disruption of said driving connection for lifting said pawl to an inoperative position remote from said element during any relative angular relation of said driving and driven members.

9. A clutch of the class described, comprising a rotatable driven member, a pair of complementary, substantially semicircular lever units pivotally mounted on said driven member at a pair of adjacent ends, a rotatable driving member coaxial with said driven member, cooperative drive means on said driving member and each of said lever units for effecting a releasable driving connection therebetween when said units are in an inward, operative position whereby said members rotate together, said connection being releasable upon the occurrence of a given overload to permit relative rotation between said members, and means for pivoting each of said units outwardly to an inoperative position out of contact with said driving member when an overload effects release of said driving connection and said members rotate relative to one another.

10. A clutch of the class described, comprising a rotatable driven member, a pair of complementary, substantially semicircular lever units, means pivotally mounting a pair of adjacent ends of said lever units upon said driven member whereby said units extend substantially coaxially to said driven member, a rotatable driving member coaxial with said driven member, means on said driving member and on each of said lever units for effecting a releasable driving connection therebetween when said units are in an inward, operative position, said connection being releasable upon the occurrence of a given overload to permit relative rotation between said members, and cooperative means on said driving member and said lever units adapted to engage and to pivot said units outwardly to an inoperative position out of contact with said driving member when said driving member rotates relative to said driven member.

References Cited in the file of this patent

UNITED STATES PATENTS

| | | |
|---|---|---|
| 1,548,427 | Aldeen | Aug. 4, 1925 |
| 2,202,497 | Landahl | May 28, 1940 |
| 2,425,736 | Hall | Aug. 19, 1947 |
| 2,519,848 | Osterdahl | Aug. 22, 1950 |

FOREIGN PATENTS

| | | |
|---|---|---|
| 540,559 | France | Apr. 19, 1922 |
| 324,877 | Great Britain | Feb. 6, 1930 |